No. 887,379. PATENTED MAY 12, 1908.
E. B. CLARK.
METHOD OF PREPARING ORES FOR USE IN THE MANUFACTURE OF STEEL.
APPLICATION FILED NOV. 11, 1907.
2 SHEETS—SHEET 2.
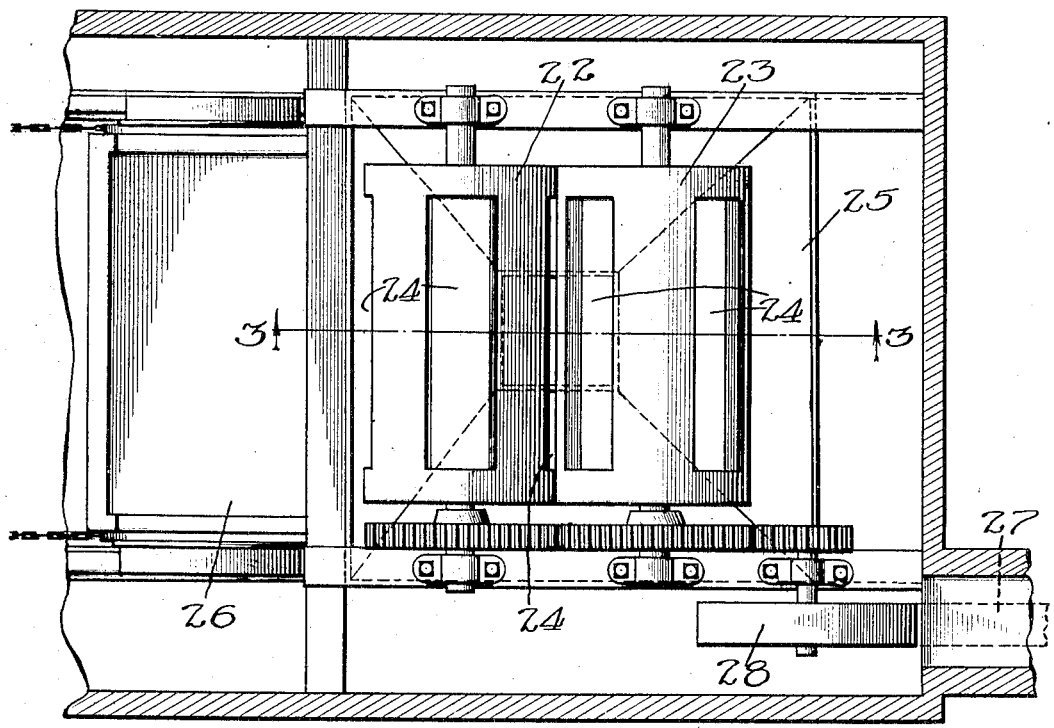
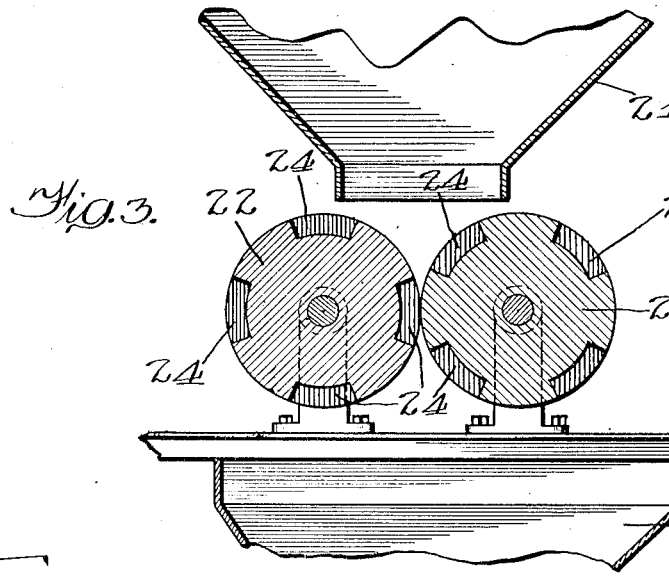

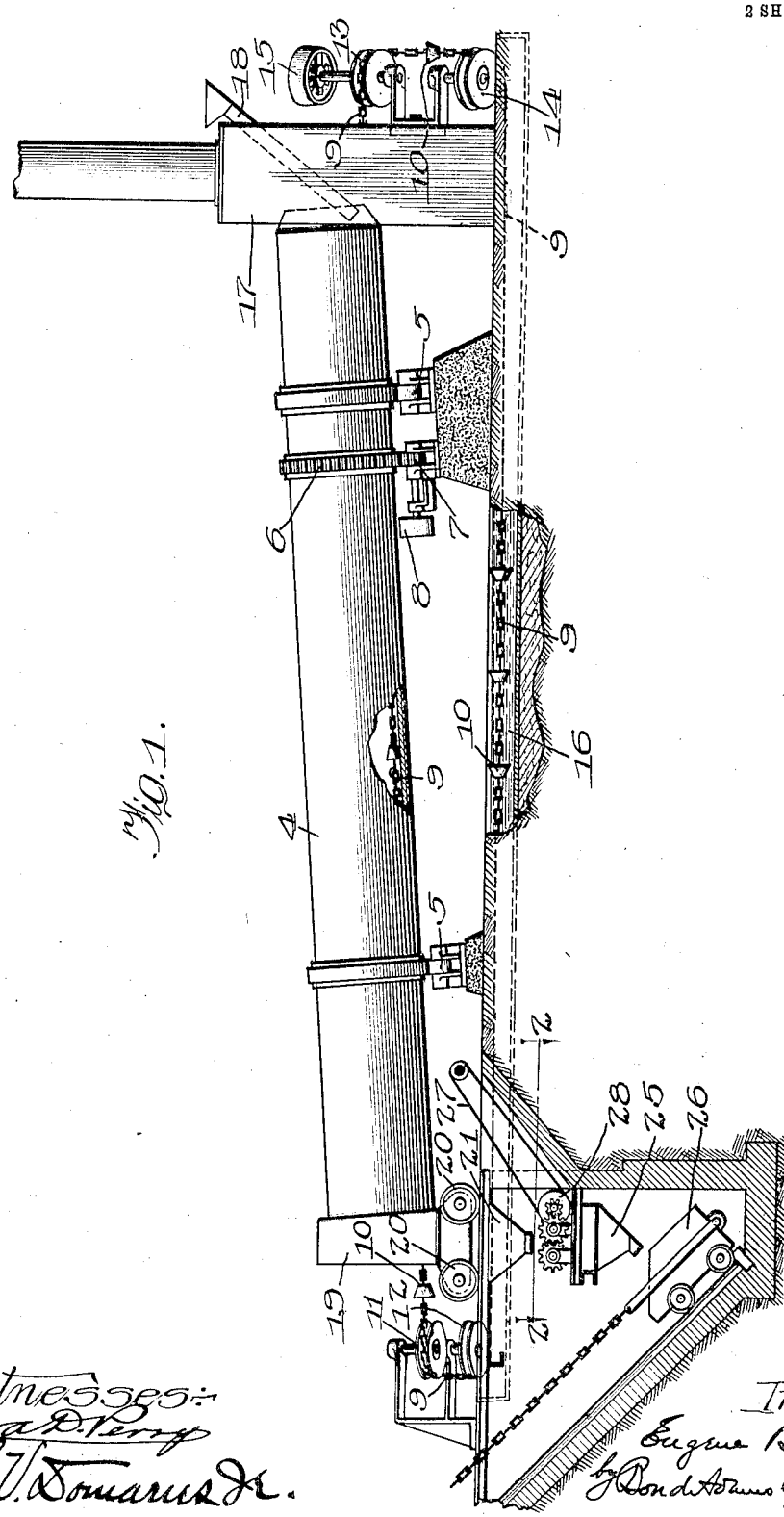

UNITED STATES PATENT OFFICE.

EUGENE B. CLARK, OF CHICAGO, ILLINOIS, ASSIGNOR TO AMERICAN SINTERING COMPANY, OF CHICAGO, ILLINOIS, A CORPORATION OF ILLINOIS.

METHOD OF PREPARING ORES FOR USE IN THE MANUFACTURE OF STEEL.

No. 887,379.  Specification of Letters Patent.  Patented May 12, 1908.

Application filed November 11, 1907. Serial No. 401,713.

To all whom it may concern:

Be it known that I, EUGENE B. CLARK, a citizen of the United States, residing at Chicago, in the county of Cook and State of Illinois, have invented a certain new and Improved Method of Preparing Ores for Use in the Manufacture of Steel, of which the following is a specification, reference being had to the accompanying drawings.

My invention relates to the treatment of ores for the purpose of preparing them for use in the manufacture of steel by the open hearth process.

As is well known to those familiar with the art, the bulk of the steel manufactured is made by one of two processes,—to-wit, the Bessemer process and the open hearth process. The Bessemer process consists in blowing air through a bath of molten iron with a view to oxidizing the impurities contained in the pig-iron. This oxidation produces the heat necessary without the burning of additional fuel. There are really two Bessemer processes, that known as the acid and that known as the basic. In the acid process, it is not possible to remove phosphorus from the iron, and, inasmuch as practically all the phosphorus contained in the iron, the coke and the limestone used in the manufacture of pig-iron must appear in the pig-iron, the phosphorus contained in the raw materials appear also in the steel. Since a high percentage of phosphorus in the steel is objectionable for many purposes, it is necessary when manufacturing steel by the acid process to utilize iron derived from so-called Bessemer ores,—that is, ores having a comparatively small percentage of phosphorus. In the basic process, it is possible to remove phosphorus, but in order to utilize the basic Bessemer process satisfactorily, it is necessary that the pig-iron, and therefore the ore of which the pig-iron is made, shall contain a comparatively high percentage of phosphorus. Therefore, ore containing too much phosphorus for the acid Bessemer process and too little phosphorus for the basic Bessemer process must be manufactured into steel by some other process, as, for example, the open hearth process. Open hearth steel also may be manufactured by either the acid process or the basic process, and it is also true that in the acid open hearth process phosphorus cannot be removed, but it can be satisfactorily removed in the basic open hearth process. This is true because in the open hearth process it is not necessary to depend on the heat developed by the oxidation of the impurities in the iron, inasmuch as heat is supplied to the furnace from fuel burned. In view of these facts, it is evident that those ores which have too much phosphorus for the acid Bessemer process and too little phosphorus for the basic Bessemer process, must be converted into steel by the basic open hearth process, since the demand for low-phosphorus steel is so great. As a matter of fact, a large and increasing proportion of the available ore supply falls into the category of ores which must be converted into steel through the medium of the basic open hearth process. This explains the well-recognized fact that the open hearth process,—and especially the basic open hearth process,—has increased in importance to a remarkable extent, and is destined to increase still more in the future.

In the operation of the open hearth process, it is necessary to use ore,—that is, iron oxid,—in order to supply the necessary amount of oxygen to the bath of molten iron in the furnace. This ore should have certain qualities. In the first place, it should be in lumps, so that it can be thrown into the bath and will immediately pass through the slag floating on the top thereof and so reach the metal underneath. The ore should be low in silica in order that it may not increase the necessary slag volume, or attack the lining of the furnace. Ore of this character has always been difficult to obtain, and the very greatly increased demand has made the procuring of desirable ore a matter of great difficulty, as it is also of great importance. Where a large percentage of molten pig-iron is used in the manufacture of the steel, it is customary to put fine ore into the furnace before pouring in the molten pig-iron. Under these conditions, the reaction between the ore and the pig-iron is delayed, and when it takes place, is extremely violent, nearly always causing slag and metal to boil out of the door of the furnace and sometimes causing violent explosions that result in destroying the roof of the furnace and also in doing great damage and endangering life in the steel plant.

The supply of fine ores having the proper chemical composition is adequate, but heretofore it has not been practicable to use them generally owing to the objection above noted. The object of my invention is to provide a new and improved method of treating such fine ores so that they may be satisfactorily and successfully employed without producing the violent reactions above described. My invention also includes the product produced by my process, as well as the apparatus employed in carrying out my said process. The apparatus, however, is not herein claimed, as it will form the subject-matter of a separate application for patent.

My improved method or process consists in first subjecting the fine ores to a sintering operation by which the ores are agglomerated into small lumps, and then compressing the agglomerated or sintered ore while in a semi-plastic condition into blocks or masses of a size suited to the open hearth requirements. I have discovered that this material, when compressed into blocks or masses, will stick together solidly and will be of the physical character required for ore to be used in the open hearth process. My improved process may be employed in the treatment of flue-dust, pyrites residue, or other materials which now are not at all used in the open hearth process,—that is to say, it is not necessary that fine ores be used for the manufacture of these open hearth blocks or lumps, but either fine ore or suitable waste products, or a mixture of fine ore and suitable waste products may be employed.

In the drawings I have shown one form of apparatus which may be conveniently employed for carrying out my improved method, the apparatus shown being in part similar to the apparatus for sintering fine ores illustrated and described in patent to J. G. Bergquist, No. 853,433, dated May 13, 1907. It will be understood, however, that any other suitable form of apparatus may be employed.

In the drawings:—Figure 1 is a side elevation of a rotary kiln, with the compressing mechanism, some parts being in section; Fig. 2 is a horizontal section on line 2—2 of Fig. 1; and Fig. 3 is a vertical section on line 3—3 of Fig. 2.

Referring to the drawings, 4 indicates a rotary kiln in the form of a hollow cylinder suitably lined with refractory material. Said kiln is mounted on rollers 5 so that it may rotate freely and is provided with a gear 6 which meshes with a pinion 7 driven from any suitable source of power, as, for example, the pulley 8 which is driven by a belt. The kiln 4 is rotated slowly while in operation and in general operates in the manner described in said Bergquist patent. The kiln 4 is inclined slightly from its inlet to its outlet end so that the material entering at one end gradually moves downward and is discharged at the lower end. For the purpose of scraping the material from the inner surface of the kiln, an endless chain 9 is provided which is equipped with scrapers 10 placed at intervals so that as the chain travels through the kiln moving in the same direction as the material therein, it scrapes the inner surface of the kiln and promotes the passage of the material therethrough. The chain 9 is supported by suitable pulleys 11—12—13—14, all or a part of which are driven by any suitable means. In the drawings, I have illustrated the pulley 13 as being provided with a pulley 15 by which it is driven. 16 indicates a water bath through which that portion of the chain lying outside of the kiln passes for cooling purposes. 17 indicates the base portion of a stack or chimney which connects with the upper or inlet end of the kiln, and 18 indicates a feed chute which discharges the materials to be treated into the upper end of the kiln. 19 indicates a chambered closure which connects with the delivery end of the kiln, being mounted on wheels 20 so that it may readily be moved toward and from the kiln. All these parts are illustrated and described in the Bergquist patent hereinbefore mentioned, and, separately considered, form no part of my invention.

21 indicates a hopper located below the delivery end of the kiln into which the materials passing through the kiln are discharged.

22—23 indicate rolls located under the discharge opening of the hopper 21, as best shown in Fig. 3. Said rolls are provided with pockets or recesses 24 at intervals in their peripheries, the pockets of one roll being staggered with reference to those of the other, and the rolls are so arranged as to coöperate to compress in said pockets the material passing through the hopper 21. To this end, the rolls are placed in such position that the material falling through the hopper is deposited on the peripheries of the rolls and enters the pockets of one roll or the other and is compressed by the periphery of the other roll. The material so compressed in the pockets of the rolls is deposited by the rotation of the rolls in a hopper 25 which underlies the rolls, as shown in Fig. 3, and preferably is discharged from the hopper 25 into a skip 26 by which it may be hoisted to any suitable point. The rolls 22—23 are driven in any suitable way, preferably by means of a belt 27 working on a pulley 28 which drives suitable intermeshing gears carried by the rolls 22—23.

It will be noted from the foregoing description, that the material coming from the kiln is immediately delivered while in a semi-plastic condition to the compressing rolls, which at once compress it into the form of blocks or lumps which are of suitable size to be used in the open hearth process, so that the flue-dust or other material treated is converted physically into such form that it may be successfully employed in that way.

While I prefer to make the pockets in the compressing rolls brick-shaped, they may be of any other suitable shape.

I am aware that it has heretofore been proposed to convert granular or pulverulent ores into lumps by intimately mixing therewith molten slag, or other binding agent, but such process differs radically from mine in that the masses thereby formed are not homogeneous and are held together solely by means of the binding agent. I am also aware that it has been proposed to form fine ores into masses by dropping the fine ore through an open furnace chamber upon rollers which act to compress the powdered ore while in a partly fused condition. This process also differs from mine in that the ores are not first agglomerated into small homogeneous masses which are afterwards compressed into larger lumps. Neither of the two methods referred to nor the products thereby produced are herein claimed.

What I claim as my invention and desire to secure by Letters Patent is:—

1. The method of treating fine ores for the purpose described, which consists in first agglomerating the ore into small substantially homogeneous lumps and then compressing the agglomerated ore into larger lumps or blocks.

2. The method of treating fine ores for the purpose described, which consists in passing the ore through a substantially horizontal cylindrical kiln wherein it is reduced to a semiplastic condition by heat, the kiln being meanwhile rotated to agglomerate the ore into small homogeneous lumps, and then compressing such lumps into larger lumps or blocks.

3. The product composed of a number of small homogeneous lumps of agglomerated ore compressed together while in a semiplastic condition.

EUGENE B. CLARK.

Witnesses:
ALBERT H. ADAMS,
WILLIAM H. DE BUSK.